Patented Oct. 1, 1940

2,216,437

UNITED STATES PATENT OFFICE 2,216,437

PROCESS FOR CONVERTING ACETYLENE INTO HIGHER MOLECULAR PRODUCTS

Paul Halbig, Emil Reiter, and Friedrich Stadler, Munich, Germany, assignors to Consortium für Elektrochemische Industrie, G. m. b. H., Munich, Bavaria, Germany, a corporation of Germany No Drawing. Application June 4, 1938, Serial No. 211,804. In Germany June 11, 1937

9 Claims. (Cl. 260—678)

This invention relates to the conversion of acetylene into unsaturated hydrocarbons of higher molecular weight, particularly vinyl acetylene, and has for its object to provide a new and improved process for this purpose.

We have found that the latter hydrocarbons are generated by passing acetylene in contact with basic catalysts at elevated temperatures. Examples of suitable basic catalysts are alkali metal hydroxides, alkaline earth metal oxides, hydroxides and carbides, oxides and hydroxides of rare earth metals, iron, aluminum and other equivalent substances. These compounds may be used in various modifications and mixtures. It is essential that the catalysts contain alkali hydroxide.

The Feuchter reaction occurs, as is known, by introducing acetylene into a melted mixture of potassium and sodium hydroxide; the acetylene transforms into salts of acetic acid. (Feuchter, Chemiker Zeitung, vol. 38, page 274 (1914); Fry et al. Jour. Am. Chem. Soc., vol. 46, pages 2270-1 (1924)). However, we have discovered that if the generation of a homogeneous fusion of the basic substances is avoided, these substances work upon acetylene as catalysts without reacting therewith.

The efficiency of the catalyst depends upon its surface area; the various oxides themselves, as well as activated carbon and/or other substances with active surfaces, may be used as surface-forming means. Moreover, the effectiveness of the catalyst depends, according to its composition, on the degree of heat which is used when drying the catalyst mass. Since there are a great many possible variations with the various catalysts, the most favorable conditions and materials must be determined in each individual case. The examples given below, therefore, are to be taken only by way of illustration and are not to be construed as limiting the invention in any way.

The contact of the acetylene with the catalyst may take place either in the liquid or vapor phase. In operating in the liquid phase a great many substances are available as reaction media, such as kerosene, petroleum fractions, acetals, ethers and other compounds which are inactive under the conditions of the reaction. In every case care must be taken to insure satisfactory removal of the reaction heat by any suitable means such as external cooling, high gas velocity, addition of inert gases or vapors, partial conversion, etc. The reaction temperatures are preferably between 100 and 300° C. The acetylene may be used in pure or diluted form. Pressures above and below atmospheric, as well as variation of the composition of the catalyst, reaction temperature, gas velocity, addition of inert gases, amount of conversion, etc., influence the composition of the reaction products.

The isolation of the reaction products, in so far as they are in a liquid state at room temperature, is effected by condensation and fractional distillation; the monovinyl acetylene may be separated from unreacted acetylene and obtained in pure form according to any conventional process, for example by cooling to a low degree or by washing out with selective solvents. Still it is also possible to subject the reaction mixture to further conversion without previous separation.

Example 1

Through a pipe, filled with pieces of soda lime of about the size of a pea, 50 litres of acetylene are passed per litre of reaction space. At 250° C., for example, about 20 litres are converted. The conversion products are separated from the unreacted acetylene according to any conventional method, for example by cooling. On fractionating, about equal parts by weight of monovinyl acetylene and divinyl acetylene and higher boiling condensation products are obtained.

Example 2

60 parts of calcium oxide, 5 parts of iron hydroxide and 7 parts of sodium hydroxide are crushed to as homogeneous a paste as possible and dried by heating to 500 to 800° C. The dry product is finely divided and dispersed in 300 parts of kerosene. Through this suspension about 50–300 litres of acetylene per litre of reaction space and per hour are passed at 180 to 280° C. Monovinyl acetylene is obtained as the principal reaction product.

Example 3

100 parts of magnesium oxide are thoroughly mixed wtih 5 parts of iron hydroxide and made incandescent at 700° C. The product is crushed into a paste with 7 parts of caustic soda and 2 parts of potassium hydroxide and water, formed into pieces and dried by heating for several hours at about 700° C. The catalyst particles are heated in a reaction tube to about 200° C. and acetylene is passed in. The reaction heat which is generated is dissipated by suitably arranged cooling spaces. The result is similar to that in Example 2.

The invention claimed is:

1. Process for converting acetylene into monovinyl acetylene which comprises passing acetylene in contact with an unfused alkali hydroxide catalyst at a temperature of 100–300° C.

2. Process for converting acetylene into monovinyl acetylene which comprises passing acetylene at a temperature of 100–300° C. in contact with an unfused catalyst comprising finely divided alkali hydroxide.

3. Process for converting acetylene into monovinyl acetylene which comprises passing acetylene at a temperature of 100–300° C. in contact with a catalyst comprising an alkali hydroxide and an oxide of an alkaline earth metal.

4. Process for converting acetylene into monovinyl acetylene which comprises passing acetylene at a temperature of 100–300° C. in contact with a catalyst comprising an alkali hydroxide, an oxide of an alkaline earth metal and a basic iron compound.

5. Process for converting acetylene into monovinyl acetylene which comprises passing acetylene at a temperature of 100–300° C. in contact with a catalyst comprising an alkali hydroxide and said catalyst suspended in an inert liquid reaction medium.

6. Process for converting acetylene into monovinyl acetylene which comprises activating a catalyst comprising an alkali hydroxide, an oxide of an alkaline earth metal and a basic iron compound by heating same to a temperature above 300° C. and then passing acetylene in contact with said activated catalyst at a temperature of 100–300° C.

7. Process for converting acetylene into monovinyl acetylene which comprises heating a catalyst consisting of sodium hydroxide, calcium oxide and iron hydroxide to a temperature of 500–800° C., dispersing said catalyst in a paraffin hydrocarbon, and passing acetylene through said dispersion at a temperature of 180–280° C.

8. Process for converting acetylene into monovinyl acetylene which comprises heating a catalyst consisting of sodium hydroxide, magnesium oxide and iron hydroxide to incandescence at 700° C., and passing acetylene in contact with said catalyst at a temperature of about 200° C.

9. Process for converting acetylene into monovinyl acetylene which comprises passing same in contact wtih soda lime at a temperature of about 250° C.

PAUL HALBIG.
EMIL REITER.
FRIEDRICH STADLER.